May 9, 1933.  H. C. DRAKE  1,907,756
MEANS FOR DETECTING BROKEN RAILS
Filed Oct. 13, 1930
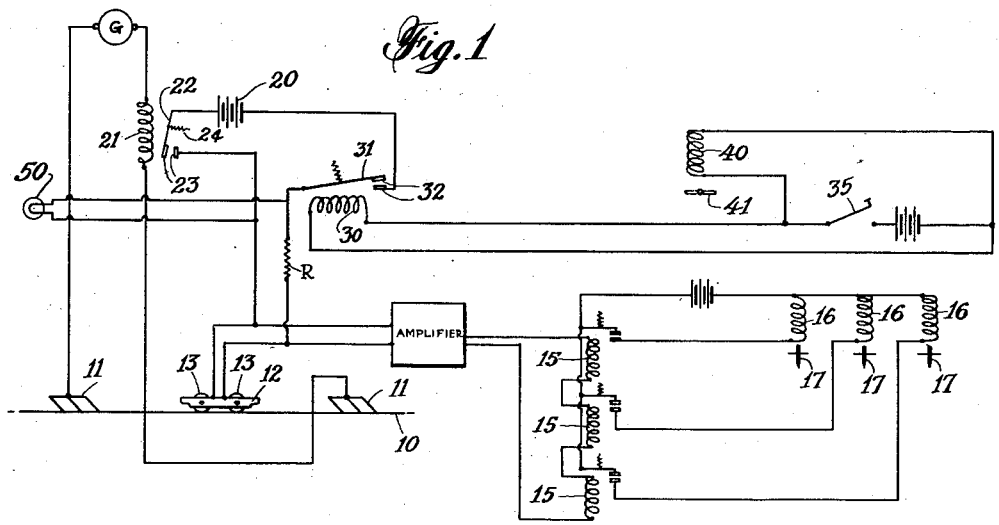
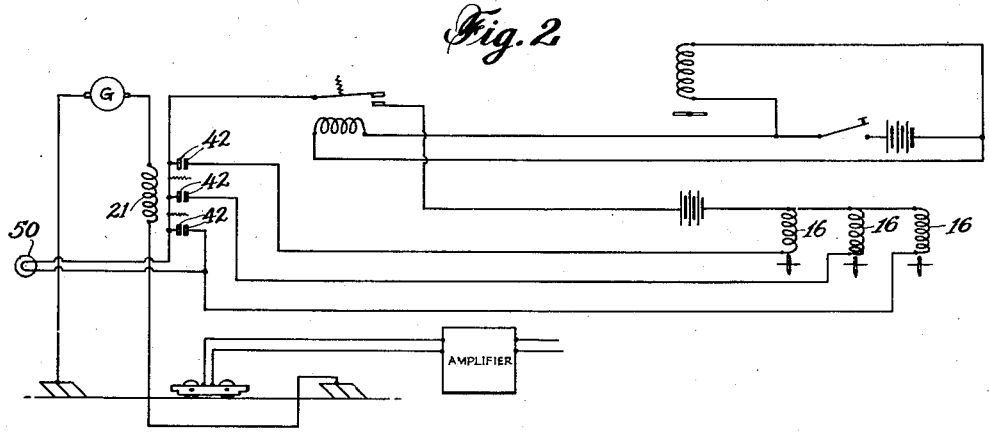
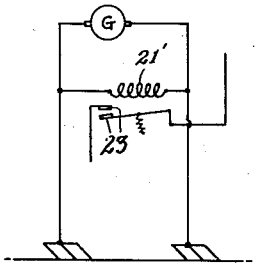
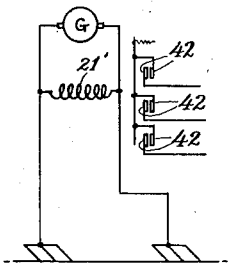
INVENTOR
Harcourt C. Drake
BY
Joseph H. Lipschutz
ATTORNEY Patented May 9, 1933

1,907,756

UNITED STATES PATENT OFFICE

HARCOURT C. DRAKE, OF HEMPSTEAD, NEW YORK, ASSIGNOR TO SPERRY PRODUCTS, INC., OF BROOKLYN, NEW YORK, A CORPORATION OF NEW YORK

MEANS FOR DETECTING BROKEN RAILS

Application filed October 13, 1930. Serial No. 488,375.

This invention relates to means for detecting flaws in rails, and particularly to the Sperry rail flaw detector, such as that described in Patent No. 1,820,505 to Elmer A. Sperry, for Fissure detector for metals, granted Aug. 25, 1931. The principle of the Sperry rail flaw detector is now well known and consists in sending a heavy current through the rail and moving a detector unit over the rail in order to cut the lines of force of the electro-magnetic field established by the current passing therethrough. The occurrence of flaws within the rail will cause a displacement of the field with consequent variation of induced E. M. F. of the detector unit, and said variation is caused, after amplification, to operate one or more pens on a recording chart in accordance with the size of the rail fissure.

It has been found, however, that in the event that a rail is completely severed, the detector device no longer operates to detect such break, because obviously such a break interrupts the circuit through the rail, and since there is no current flowing through the rail at that time there can be no electro-magnetic field and hence the detector unit is ineffective at that time. It is the principal object of my invention, therefore, to provide means which will indicate a complete break in the rail. Preferably I provide means whereby the ordinary pens which indicate flaws will be operated to indicate a complete break in the rail as well.

My invention for locating broken rails may be used independently of the flaw detector mechanism.

Further objects and advantages of my invention will become apparent in the following detailed description thereof.

In the accompanying drawing,

Fig. 1 is an assembly view consisting largely of a wiring diagram showing the necessary electrical connections.

Fig. 2 is a view similar to Fig. 1, but disclosing a modified form of the invention.

Fig. 3 is a detail similar to a portion of the showing in Fig. 1 and 2 and disclosing a further modification of my invention.

Fig. 4 is a view similar to Fig. 3, of still another modification of this invention.

Referring to Fig. 1 of the drawing, I have disclosed in the form of a wiring diagram the principle of the Sperry rail flaw detector, which consists in providing a generator G of large amperage which sends current through the rail 10 by means of contact brushes 11, 11. A detector unit 12, comprising a pair of opposed coils 13, operates on the rail surface to pick up any variations in the electro-magnetic field caused by fissures or other defects. Such variations result in inducing in the opposed coils 13 electromotive forces of different magnitudes, and said differential electromotive forces are passed through an amplifier, and the output of said amplifier actuates a set of relays 15 to control the circuit through a set of magnets 16, operating respective pens 17. The magnets are constructed with different degrees of responsiveness, so that the number of pens that are actuated gives an indication of the size and seriousness of the fissure encountered.

From the above description it is apparent that if a complete break in the rail occurs, the current will not pass through the rail and hence no electro-magnetic field will be established and the detector unit will be ineffective to detect the break. In order that the pens may indicate a flaw under such conditions also, I provide the following mechanism: I cause an E. M. F. to be impressed upon the input of the amplifier when a break in the rail occurs in the same manner as an E. M. F. is impressed upon the input of said amplifier when a flaw is detected in the usual manner by the pick-up or detector unit. This E. M. F. I supply from an independent source in the form of a battery 20 whose terminals are connected in parallel with said detector unit, through a suitable resistance R, across the input of the amplifier. The circuit including said battery, which is designed to impress the E. M. F. upon the amplifier, is normally held open by a relay 21 in the generator circuit attracting an armature 22 carrying one contact of a set of contacts 23 in the battery circuit. When, however, a broken rail is encountered, the current through the relay drops rapidly, causing said relay to release its armature and permitting a spring 24 to draw the said armature and its contact into engagement with the opposite contact to close the battery circuit. An E. M. F. is then impressed upon the amplifier and in the usual manner the set of pens 17 is operated to indicate a flaw.

From the above description it will be readily apparent that the means for locating broken rails, that is, the mechanism which responds to a broken rail to give an indication, may be utilized irrespective of the presence of the detector unit 12.

When the detector mechanism is out of operation and the generator is not running, the battery circuit would, under the circumstances enumerated above, normally be closed and the battery 20 would function to impress an E. M. F. upon the amplifier. In order to avoid this situation, I provide the following means for opening the battery circuit when the detecting device is out of operation. For this purpose I provide a magnet 30 which cooperates with an armature 31 to maintain a set of contacts 32 in the battery circuit closed when the device is functioning. Said device is functioning when the brushes 11 are lowered into engagement with the rails. At all other times said brushes are elevated to an inoperative position. I therefore cause the magnet 30 controlling the last named set of contacts 32 to be energized whenever the brushes 11 are lowered to effective position and de-energized whenever said brushes are raised to ineffective position. For this purpose the said magnet is included in the separate circuit which, when the operator depresses a key 35, is closed to energize a magnet 40 which operates on the brush mechanism to raise and lower the same. Thus, when the key is depressed to close the circuit through said last named magnet 40 for lowering the brushes, a circuit is also closed through the magnet 30 which controls the battery circuit to render the same effective. Similarly, when the key is raised to break the circuit through the magnet 40 to raise the brushes, the circuit through the controlling magnet 30 is broken to permit the spring 31 to open the contacts 32 and hence open the circuit of battery 20. The magnet 40 for controlling the lowering of the brushes may act upon a compressed air valve 41, as shown, to permit compressed air to lower the brushes against the action of retracting springs which are effective to raise the brushes as soon as the said magnet is de-energized. This means for raising and lowering the brushes is fully described in my co-pending application Serial No. 436,660, filed March 18, 1930, for Improvements in rail fissure detectors.

In a slightly modified form of my invention, shown in Fig. 2, I provide a separate circuit and separate set of contacts 42 for each pen-operating magnet 16 and cause the relay 21 in the generator circuit to operate all of said contacts simultaneously. With this construction it is not necessary to operate through the amplifier, as in Fig. 1, but the battery voltage may be impressed immediately and directly upon the pen-operating magnets.

In all forms of this invention I may provide, in addition to the pen indicating means, a separate signal simultaneously operated for giving some other indication of a broken rail. Said signal may take the form of a light 50, as shown in Figs. 1 and 2, in the battery circuit or it may take the form of an additional pen-operating magnet similar to those shown for operating an additional pen on the same chart.

In Fig. 3 I have shown a somewhat different principle employed for effecting the same result as in the Figs. 1 and 2 forms of the invention. In this form of the invention I utilize not the drop in current incident upon the breakage of the rail, but the rapid rise in voltage across the circuit when said circuit is broken. For this purpose I connect a magnet or relay 21' across the terminals of the generator instead of in series in said circuit, as in Figs. 1 and 2, and cause said relays to operate the same contacts 23 as in Fig. 1 for controlling the auxiliary battery circuit.

The principle involved in the Fig. 3 form of the invention may be applied to the Fig. 2 form, as indicated in Fig. 4. The relay 21' connected across the terminals of the generator operates an armature carrying all three sets of contacts 42, as in the Fig. 2 form of the invention.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flaw detecting mechanism for electrical conductors, in combination, means movable relative to the conductor for passing current therethrough, means out of contact with the conductor and adapted to cut the lines of force surrounding the conductor whereby flaws are detected, an indicator operated by said last named means, and means rendered effective for operating said indicator when the circuit through the conductor is broken.

2. In a flaw detecting mechanism for electrical conductors, in combination, means movable relative to the conductor for passing current therethrough, means responsive to the lines of force surrounding the conductor whereby differential electromotive forces are induced by flaws, an indicator operated by said differential electromotive forces, an auxiliary source of electromotive force, and means whereby said auxiliary source of electromotive force is connected to said indicator to operate the same when the circuit through the conductor is broken.

3. In a flaw detecting mechanism for electrical conductors, in combination, means movable relative to the conductor for passing current therethrough, means responsive to the lines of force surrounding the conductor whereby flaws are detected, said first two means being adapted to be actuated to operative and inoperative positions, an indicator operated by said responsive means, means rendered effective for operating said indicator when the circuit through the conductor is broken, and means whereby said last named means may be rendered ineffective when said first two means are actuated to inoperative position.

4. In a flaw detecting mechanism for electrical conductors, in combination, means movable relative to the conductor for passing current therethrough, means responsive to the lines of force surrounding the conductor whereby differential electromotive forces are induced by flaws, said first two means being adapted to be actuated to operative and inoperative positions, an indicator operated by said differential electromotive forces, an auxiliary source of electromotive force, means whereby said auxiliary source of electromotive force is connected to said indicator to operate same when the circuit through the conductor is broken, and means whereby said last named means may be rendered ineffective when said first two means are actuated to inoperative position.

5. In a flaw detecting mechanism for electrical conductors, in combination, means for passing current therethrough, means out of contact with the conductor and adapted to cut lines of force surrounding the conductor whereby flaws are detected, an indicator, and means whereby said indicator is actuated when the current through the conductor fails.

6. In a flaw detecting mechanism for electrical conductors, in combination, means for passing current therethrough, means out of contact with the conductor and adapted to cut the lines of force surrounding the conductor whereby flaws are detected, an indicator, means whereby said responsive means actuates said indicator, auxiliary means for actuating said indicator, and means whereby said auxiliary means is rendered effective when the current through the conductor fails.

In testimony whereof I affix my signature.

HARCOURT C. DRAKE.